(12) United States Patent
Arimitsu

(10) Patent No.: US 6,693,955 B1
(45) Date of Patent: Feb. 17, 2004

(54) PORTABLE TERMINAL

(75) Inventor: Kazuhiro Arimitsu, Tokyo (JP)

(73) Assignee: NEC Corporation, Tokyo (JP)

( * ) Notice: Subject to any disclaimer, the term of this patent is extended or adjusted under 35 U.S.C. 154(b) by 628 days.

(21) Appl. No.: 09/645,568

(22) Filed: Aug. 25, 2000

(30) Foreign Application Priority Data

Aug. 26, 1999 (JP) .......................................... 11-239983

(51) Int. Cl.$^7$ .............................. H04B 7/216; H04B 1/69
(52) U.S. Cl. ........................ 375/150; 375/343; 708/422
(58) Field of Search .............................. 375/142, 143, 375/150, 157, 343; 708/314, 422, 426

(56) References Cited

U.S. PATENT DOCUMENTS

| | | | |
|---|---|---|---|
| 4,910,752 A | | 3/1990 | Yester, Jr. et al. |
| 5,465,405 A | * | 11/1995 | Baseghi et al. ............ 455/226.4 |
| 5,841,808 A | * | 11/1998 | Rizzo et al. ................. 375/150 |
| 5,864,315 A | * | 1/1999 | Welles et al. ............ 342/357.12 |
| 6,118,808 A | * | 9/2000 | Tiemann et al. ............. 375/142 |
| 6,292,748 B1 | * | 9/2001 | Harrison ..................... 701/213 |
| 6,553,059 B1 | * | 4/2003 | Ito ............................... 375/150 |

FOREIGN PATENT DOCUMENTS

| | | |
|---|---|---|
| EP | 1 079 537 A2 * | 2/2001 |
| FR | 2 273 362 | 1/1997 |
| JP | 61-93746 A | 5/1986 |
| JP | 8-331011 | 12/1996 |
| JP | 10-145326 | 5/1998 |
| JP | 2856249 | 11/1998 |
| JP | 10-303783 | 11/1998 |
| JP | 11-8567 A | 1/1999 |
| JP | 11-17648 A | 1/1999 |
| JP | 11-68700 | 3/1999 |
| JP | 11-187450 A | 7/1999 |
| WO | 99/63677 | 12/1999 |

* cited by examiner

*Primary Examiner*—Young T. Tse
(74) *Attorney, Agent, or Firm*—Sughrue Mion, PLLC

(57) ABSTRACT

A portable terminal has a level detect or which compares profile data generated by a profile generator with a threshold value, and determines a sampling rate for a correlating process performed by a correlator based on the result of the comparison. The sampling rate is determined in order to increase the sampling rate at profile points in excess of the threshold value, of the profile data. Therefore, profile data is generated highly accurately at a higher sampling clock rate at points which require a higher accuracy, and profile data is generated at a lower sampling clock rate at points which do not require such a higher accuracy.

16 Claims, 8 Drawing Sheets

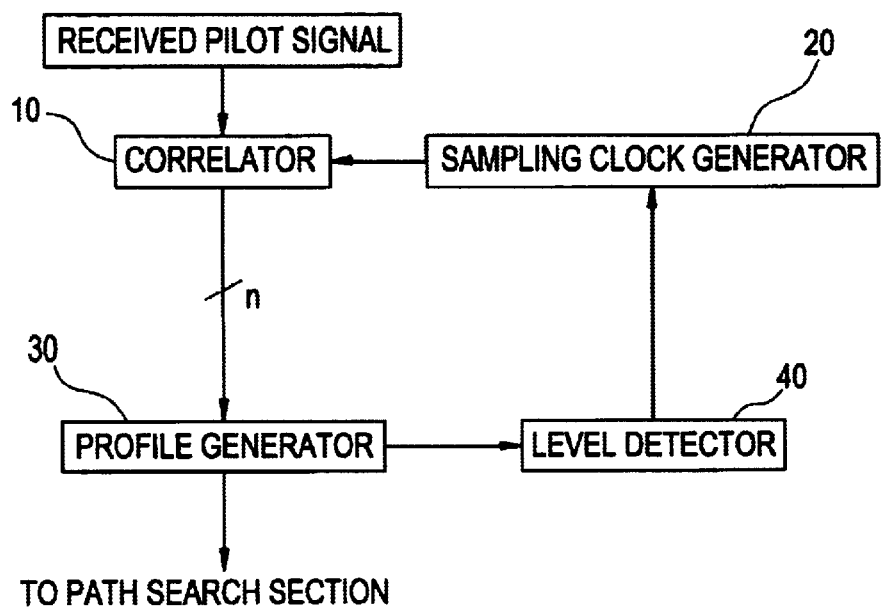
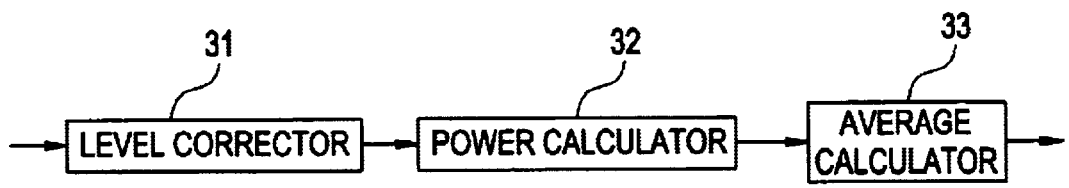

PORTABLE TERMINAL

BACKGROUND OF THE INVENTION

1. Field of the Invention

The present invention relates to a portable terminal for use in a mobile communication system based on the CDMA (Code Division Multiple Access) technique, and more particularly to a portable terminal that is capable of reducing power consumption in the generation of profile data.

2. Description of the Related Art

When a portable terminal for use in a CDMA mobile communication system receives a signal transmitted via a radio link, it despreads the received signal and outputs audio or video data based on the despread signal. Though it is necessary to recognize the timing of transmission of the signal from the base station, the portable terminal is unable to recognize the timing of transmission of the signal from the base station.

In order to detect a point (timing) to start despreading the received signal, it has been customary for the portable terminal to calculate correlated values between a plurality of known patterns that have been internally generated and the received data, generate profile data based on the calculated correlated values, and detect the timing to start despreading the received signal from a peak value of the profile data.

The portable terminal for use in the CDMA mobile communication system has heretofore been required to reduce power consumption because it performs a transmission power control process and other complex control processes.

The accuracy with which to detect a received pilot signal required to generate profile data in the above conventional portable terminal may be increased by increasing the number of sampling points. However, increasing the number of sampling points results in an increase in the power consumption by the portable terminal.

SUMMARY OF THE INVENTION

It is therefore an object of the present invention to provide a portable terminal which is capable of reducing power consumption without lowering the accuracy with which to generate profile data.

According to the present invention, a portable terminal has a level detector which compares profile data generated by a profile generator with a threshold value, and determines a sampling rate for a correlating process performed by a correlator based on the result of the comparison. The sampling rate is determined in order to increase the sampling rate at profile points in excess of the threshold value, of the profile data. Therefore, profile data is generated highly accurately at a higher sampling clock rate at points which require a higher accuracy, and profile data is generated at a lower sampling clock rate at points which do not require such a higher accuracy.

Only at the points which require a higher accuracy, the number of sampling points is increased and profile data is generated at the higher sampling clock rate. At the point which do not require a higher accuracy, the number of sampling points is reduced and profile data is generated at the lower sampling clock rate. Consequently, highly accurate profile data can be generated while at the same time the power consumption is reduced and the circuit scale of the portable terminal is reduced.

The above and other objects, features, and advantages of the present invention will become apparent from the following description with reference to the accompanying drawings which illustrate examples of the present invention.

BRIEF DESCRIPTION OF THE DRAWINGS

FIG. 1 is a block diagram of a portable terminal according to the present invention;

FIG. 3 is a block diagram of a profile generator in the portable terminal shown in FIG. 1;

DETAILED DESCRIPTION OF THE PREFERRED EMBODIMENTS

FIG. 1 shows in block form a portion of a portable terminal according to the present invention for detecting a received pilot signal and generating profile data.

As shown in FIG. 1, the portable terminal comprises correlator 10 for performing a correlating process to calculate correlated values between a received pilot signal and a plurality of known patterns that have been internally generated in timed relation to a supplied sampling clock signal, and output the calculated correlated values as correlated data, profile generator 30 for correcting the level of the correlated data outputted from correlator 10 and calculating a power value thereby to generate and output profile data, level detector 40 for comparing the profile data outputted from profile generator 30 with a predetermined threshold value, and determining a sampling rate for the correlating process performed by correlator 10 based on the result of the comparison, and sampling clock generator 20 for generating and outputting a sampling clock signal to be supplied to correlator 10 based on the determined sampling rate outputted from level detector 40. Correlator 10 performs the correlating process in timed relation to the sampling clock signal generated by the sampling clock generator 20.

Figure 2:
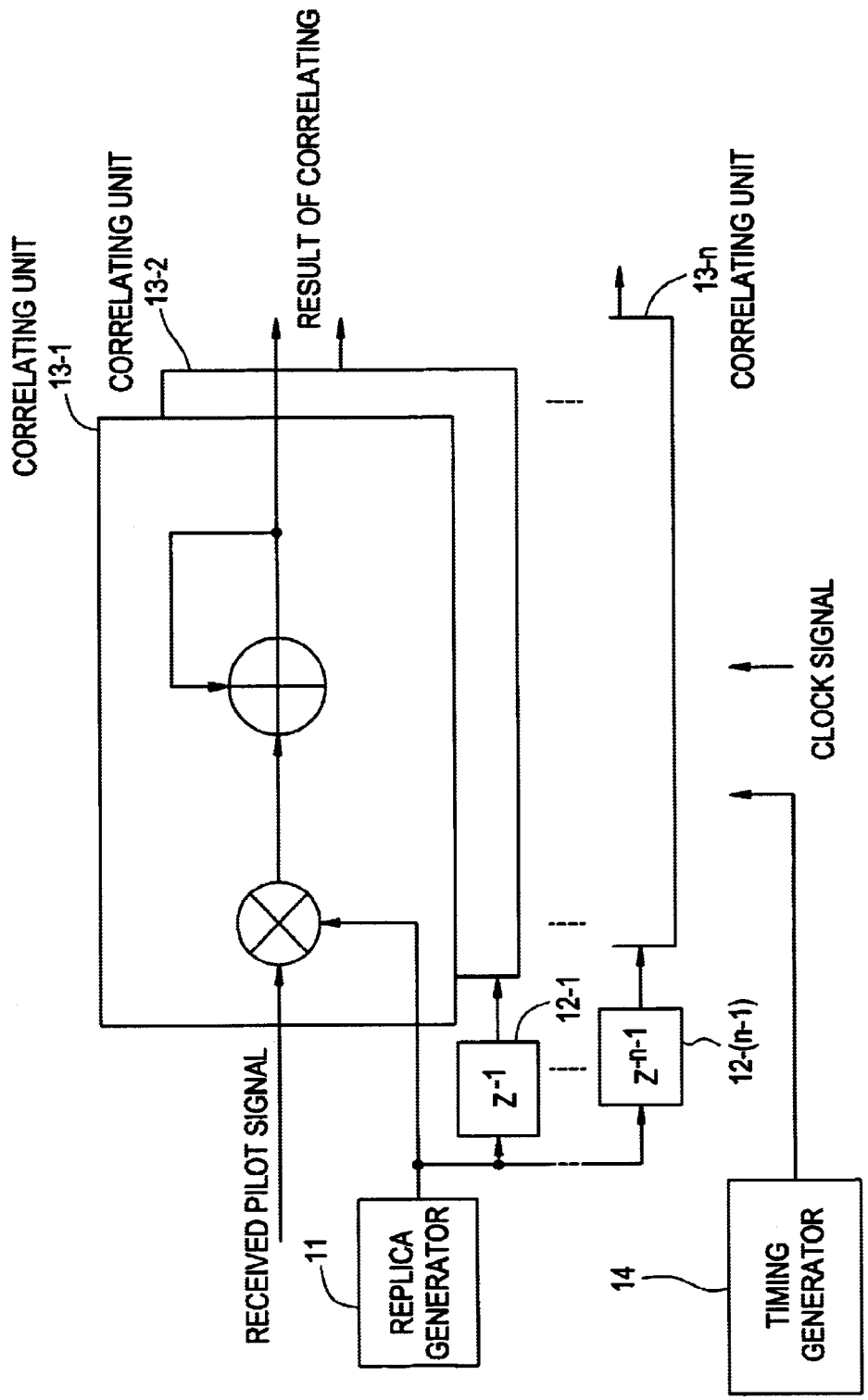
FIG. 2 is a block diagram of a correlator in the portable terminal shown in FIG. 1.

As shown in FIG. 2, correlator 10 comprises replica generator 11 for generating and outputting a known pattern for calculating a correlated value between itself and the received pilot signal, a plurality of delay elements 12-1 through 12-(n−1) for delaying the known pattern outputted from replica generator 11 by a predetermined time and outputting the delayed patterns, a plurality of correlating units 13-1 through 13-n for correlating and adding the received pilot signal and the known pattern outputted from replica generator 11 and the known patterns delayed by the respective delay elements 12-1 through 12-(n−1), and outputting the added results as correlated data, and timing generator 14 for supplying the sampling clock signal outputted from sampling clock generator 20 to correlating units 13-1 through 13-n.

As shown in FIG. 3, profile generator 30 comprises level corrector 31 for correcting the level of the correlated data outputted from correlator 10, power calculator 32 for calculating the power value of the correlated data whose level has been corrected by level corrector 31 thereby to generate profile data, and average calculator 33 for calculating an average value during a certain interval of the profile data generated by the power calculator 32 as occasion arises.

A process of generating profile data in the portable terminal thus constructed will be described below.

Figure 4:
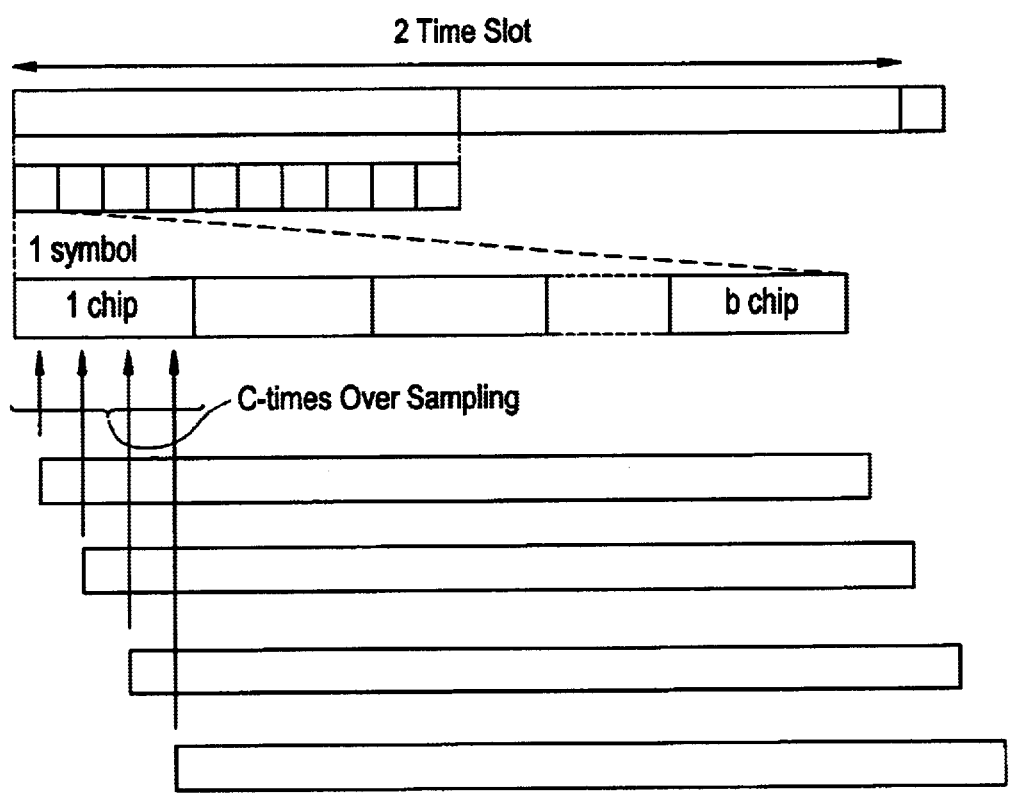
FIG. 4 is a diagram illustrative of a correlating process performed by the correlator shown in FIG. 2.

FIG. 4 is illustrative of a correlating process performed by correlator 10 shown in FIG. 2.

Correlating unit 13-1 in correlator 10 multiplies the received pilot signal by the known pattern generated by replica generator 11 at each of pulses of the sampling clock signal from timing generator 14, adds products at the respective pulses of the sampling clock signal, and outputs the sum as correlated data.

Correlating units 13-2 through 13-n multiply the received pilot signal by the known patterns generated by replica generator 11 and delayed by delay elements 12-1 through 12-(n−1) at each of the pulses of the sampling clock signal from timing generator 14, adds products at the respective pulses of the sampling clock signal, and outputs the sums as correlated data.

As shown in FIG. 4, the correlating process performed by correlator 10 needs to be carried out on N chips per symbol, and a C-times oversampling process is effected for increased detection accuracy. However, since it is time-consuming to perform the processing of (C×N) chips with one correlator, n correlating units are employed for simultaneous processing as shown in FIG. 2. At this time, the known pattern generated by the replica generator 11 is delayed 1/C chip by delay elements 12-1 through 12-(n−1).

The correlated data outputted from correlator 10 is supplied to profile generator 30. In profile generator 30, level corrector 31 corrects the level of the correlated data in order to remove a level variation error due to AGC (Automatic Gain Control) characteristics of a radio unit (not shown).

Then, power calculator 32 calculates a power value of the correlated data whose level has been corrected by level corrector 31 thereby to generate profile data.

Average calculator 33 is used to calculate average profile data over several slots.

The profile data generated by profile generator 30 is supplied to level detector 40 when next profile data is generated by profile generator 30.

Figure 5:
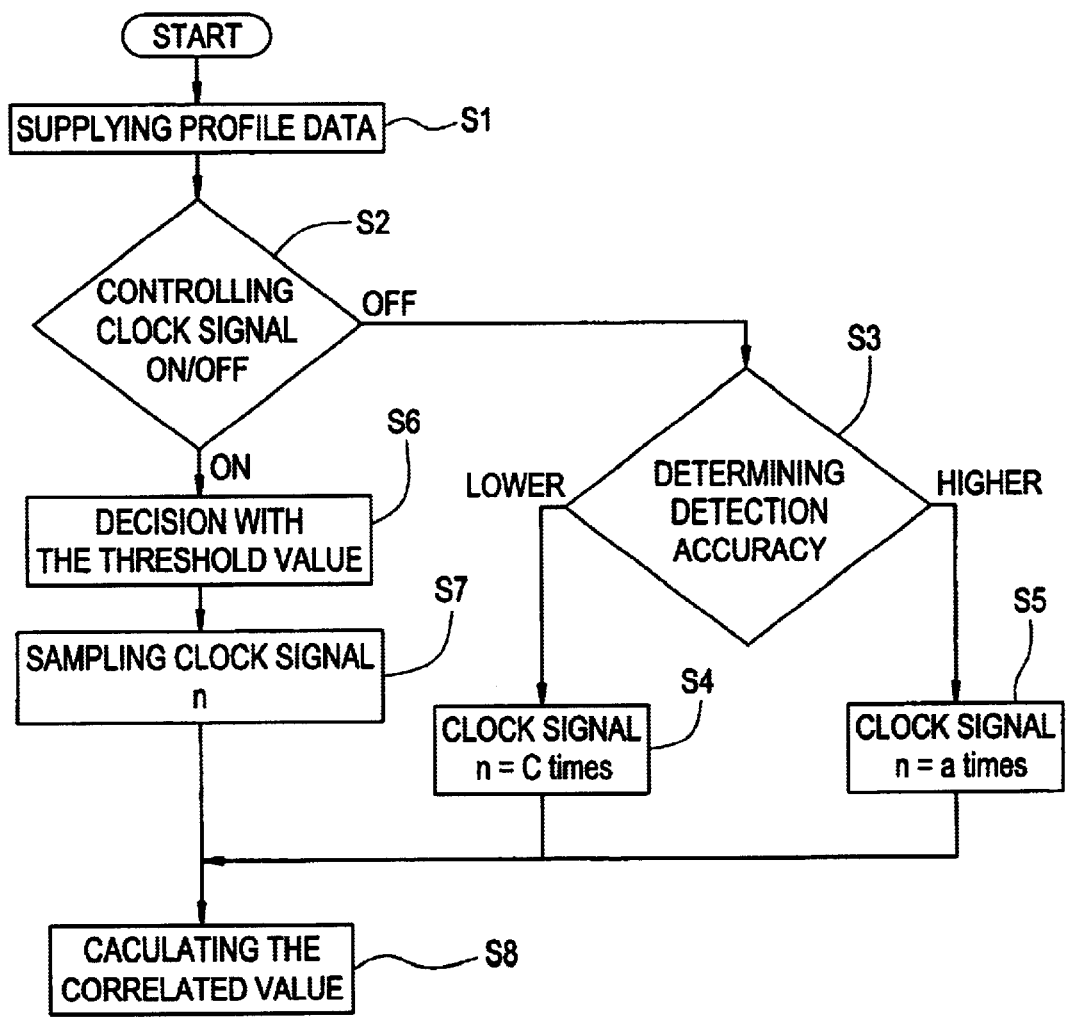
FIG. 5 is a flowchart of an operation sequence of a level detector in the portable terminal shown in FIG. 1.

FIG. 5 shows an operation sequence of level detector 40 in the portable terminal shown in FIG. 1.

As shown in FIG. 5, the profile data generated by profile generator 30 is supplied to level detector 40 in step S1. Then, level detector 40 decides whether the sampling clock signal for determining a sampling rate in correlator 10 is to be automatically controlled or not in step S2.

If the sampling clock signal is not to be automatically controlled in step S2, then level detector 40 determines the accuracy with which to detect the received pilot signal in correlator 10 in step S3.

If the detection accuracy is determined to be lower in step S3, then the sampling clock signal to be supplied to correlator 10 is determined to be of a lower clock rate (C times) in step S4. Then, level detector 40 outputs a control signal for generating the sampling clock signal to sampling clock generator 20 in step S8. Therefore, profile data is generated with a lower power.

If the detection accuracy is determined to be higher in step S3, then the sampling clock signal to be supplied to correlator 10 is determined to be of a higher clock rate (a times) in step S5. Then, level detector 40 outputs a control signal for generating the sampling clock signal to sampling clock generator 20 in step S8. Therefore, profile data is generated with a normal power.

If the sampling clock signal is to be automatically controlled in step S2, then level detector 40 compares the profile data generated by profile generator 30 with a predetermined threshold value in step S6, and determines a sampling clock signal for increasing the sampling rate, i.e., increasing the accuracy, in correlator 10 only around profile points in excess of the threshold value, of the profile data in the step S7. Thereafter, level detector 40 outputs a control signal for generating the sampling clock signal to sampling clock generator 20 in step S8.

Sampling clock generator 20 generates the sampling clock signal based on the control signal that has been supplied from level detector 40 in step S8. Correlator 10 performs its correlating process at a sampling rate based on the generated sampling clock signal.

Figure 6A:
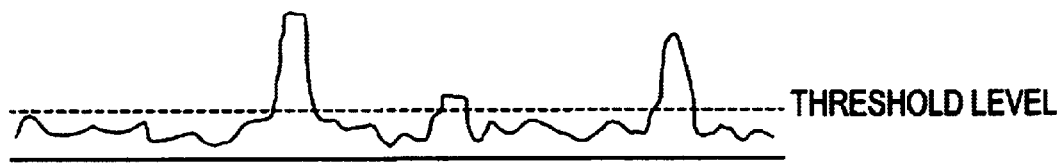
FIG. 6a is a diagram showing mth profile data generated by the portable terminal shown in FIG. 1.
Figure 6B:
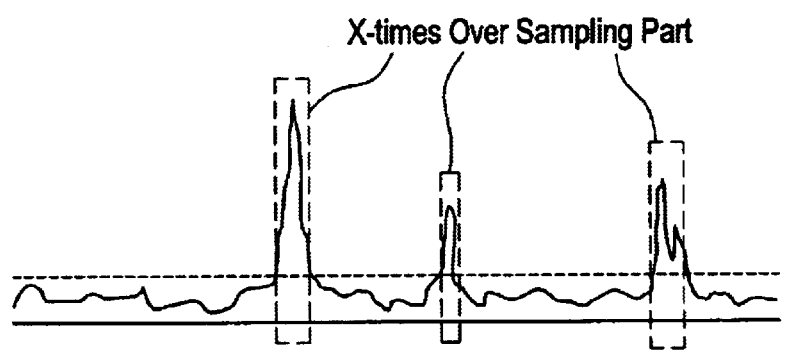
FIG. 6b is a diagram showing (m+1)th profile data generated by the portable terminal shown in FIG. 1.

FIG. 6a shows mth profile data generated by the portable terminal shown in FIG. 1, and FIG. 6b shows (m+1)th profile data generated by the portable terminal shown in FIG. 1. The profile data shown in FIG. 6a is generated if the sampling clock signal is determined to be of the lower clock rate (C times) in step S4 shown in FIG. 5.

Sampling clock generator 20 supplies a sampling clock signal having an X-times (X>C) sampling rate to correlator 10 only around points in excess of the threshold level of the mth profile data shown in FIG. 6, and correlator 10 correlates the received pilot signal using the supplied sampling clock signal.

Therefore, as shown in FIG. 6b, the (m+1)th profile data includes regions enclosed by the broken lines which are made more accurate by X-times oversampling, making it possible to obtain profile data with lower power consumption.

In other regions than the regions enclosed by the broken lines, since profile data is generated with the sampling clock signal having the lower clock rate (C times), the processing rate is much higher than if all points were processed at the n=X-times oversampling rate, and the profile data can be generated without lowering the accuracy of necessary points.

As described above, sampling clock generator 20 generates a sampling clock signal whose sampling rate is controlled based on the level of the profile data detected by the level detector 40, and correlator 10 correlates the received pilot signal with the generated sampling clock signal.

(Other Embodiment)

Figure 7:
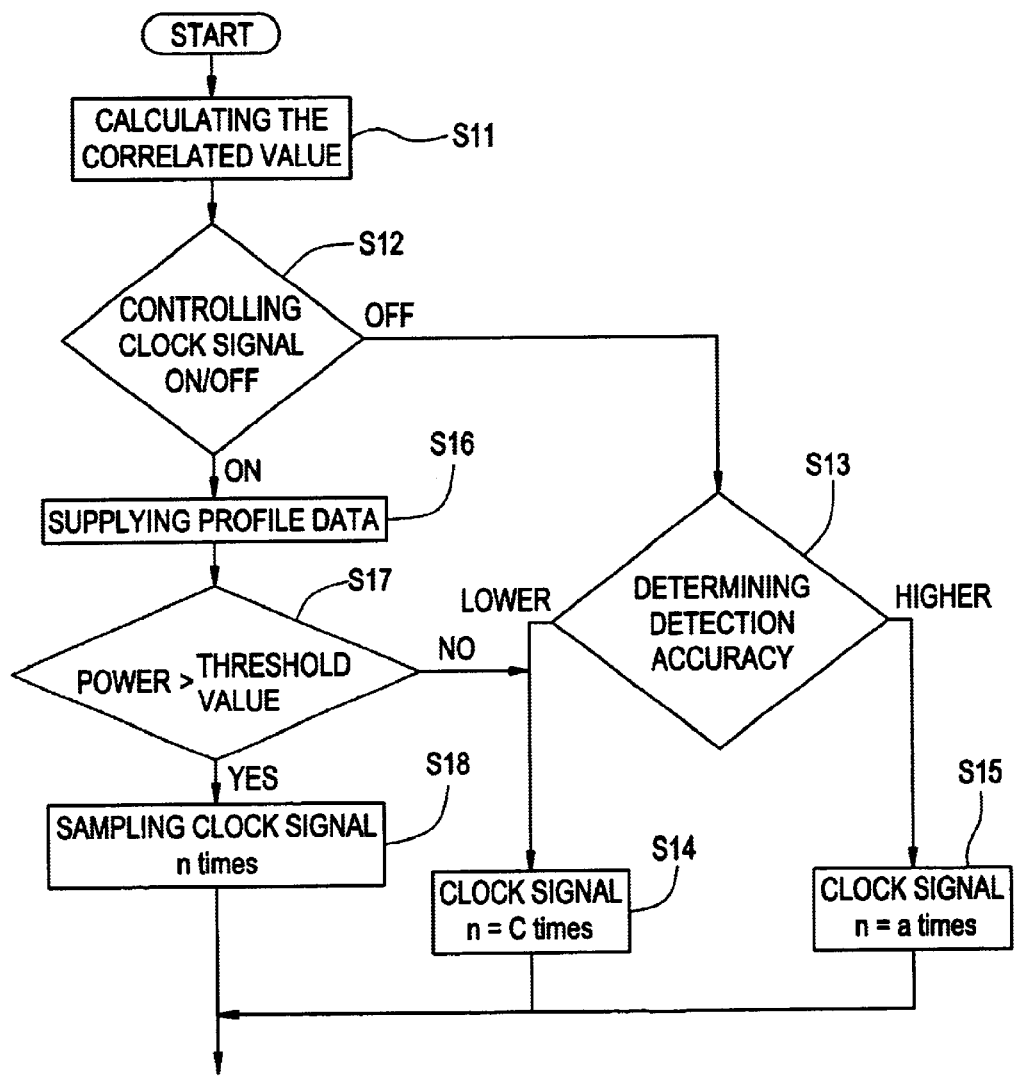
FIG. 7 is a flowchart of another operation sequence of the level detector in the portable terminal shown in FIG. 1.

FIG. 7 shows another operation sequence of level detector 40 in the portable terminal shown in FIG. 1.

Correlator 10 performs a correlating process in step S11. Then, level detector 40 decides whether the sampling clock signal for determining a sampling rate in correlator 10 is to be automatically controlled or not in step S12.

If the sampling clock signal is not to be automatically controlled in step S12, then level detector 40 determines the accuracy with which to detect the received pilot signal in correlator 10 in step S13.

If the detection accuracy is determined to be lower in step S13, then the sampling clock signal to be supplied to correlator 10 is determined to be of a lower clock rate (C times) in step S14. Therefore, profile data is generated with a lower power.

If the detection accuracy is determined to be higher in step S13, then the sampling clock signal to be supplied to correlator 10 is determined to be of a higher clock rate (a times) in step S15. Therefore, profile data is generated with a normal power.

If the sampling clock signal is to be automatically controlled in step S12, then correlator 10 calculates correlated data, and profile generator 30 generates profile data based on the correlated data calculated by correlator 10.

Then, the profile data generated by profile generator 30 is supplied to level detector 40 in step S16. Level detector 40 compares the profile data generated by profile generator 30 with a predetermined threshold value in step S17. If the profile data exceeds the threshold value, then level detector 40 determines a sampling clock signal for increasing the sampling rate, i.e., increasing the accuracy, in the subsequent correlating process in correlator 10 in step S18. Thereafter, level detector 40 outputs a control signal for generating the sampling clock signal to sampling clock generator 20. The number of correlating points is increased to generate profile data of higher accuracy.

If the profile data does not exceed the threshold value, then the sampling clock signal to be supplied to correlator 10 is determined to be of a lower clock rate (C times) in step S14.

Figure 8A:
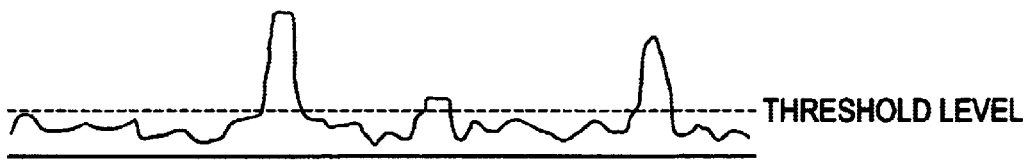
FIG. 8a is a diagram showing profile data generated at a clock rate n—a (higher accuracy) in the operation sequence shown in FIG. 7.
Figure 8B:
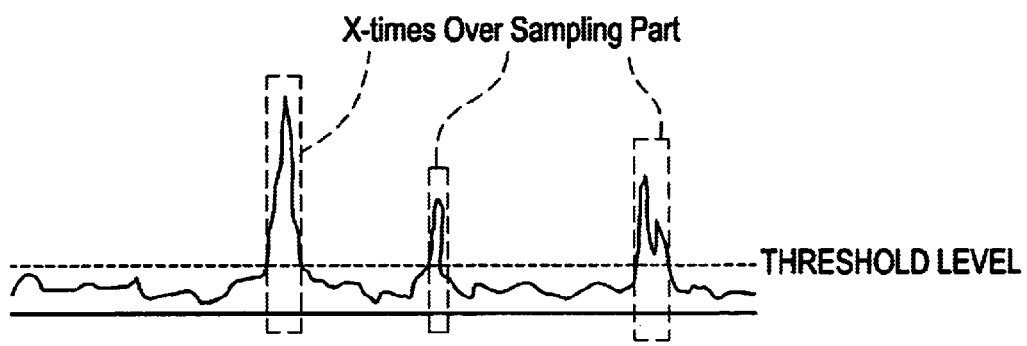
FIG. 8b is a diagram showing profile data generated at a clock rate n=C (lower accuracy) in the operation sequence shown in FIG. 7.

FIG. 8a shows profile data generated at a clock rate n=a (higher accuracy) in the operation sequence shown in FIG. 7, and FIG. 8b shows profile data generated at a clock rate n=C (lower accuracy) in the operation sequence shown in FIG. 7.

As shown in FIGS. 8a and 8b, profile data is generated with higher accuracy only in regions enclosed by the broken lines which exceed the threshold level.

The operation sequence shown in FIG. 7 offers another advantage in that profile data can be generated with a lower power even without the mth profile data.

A plurality of threshold values may be used to determine a sampling clock signal. Use of such a plurality of threshold values to determine a sampling clock signal will be described below.

Figure 9:
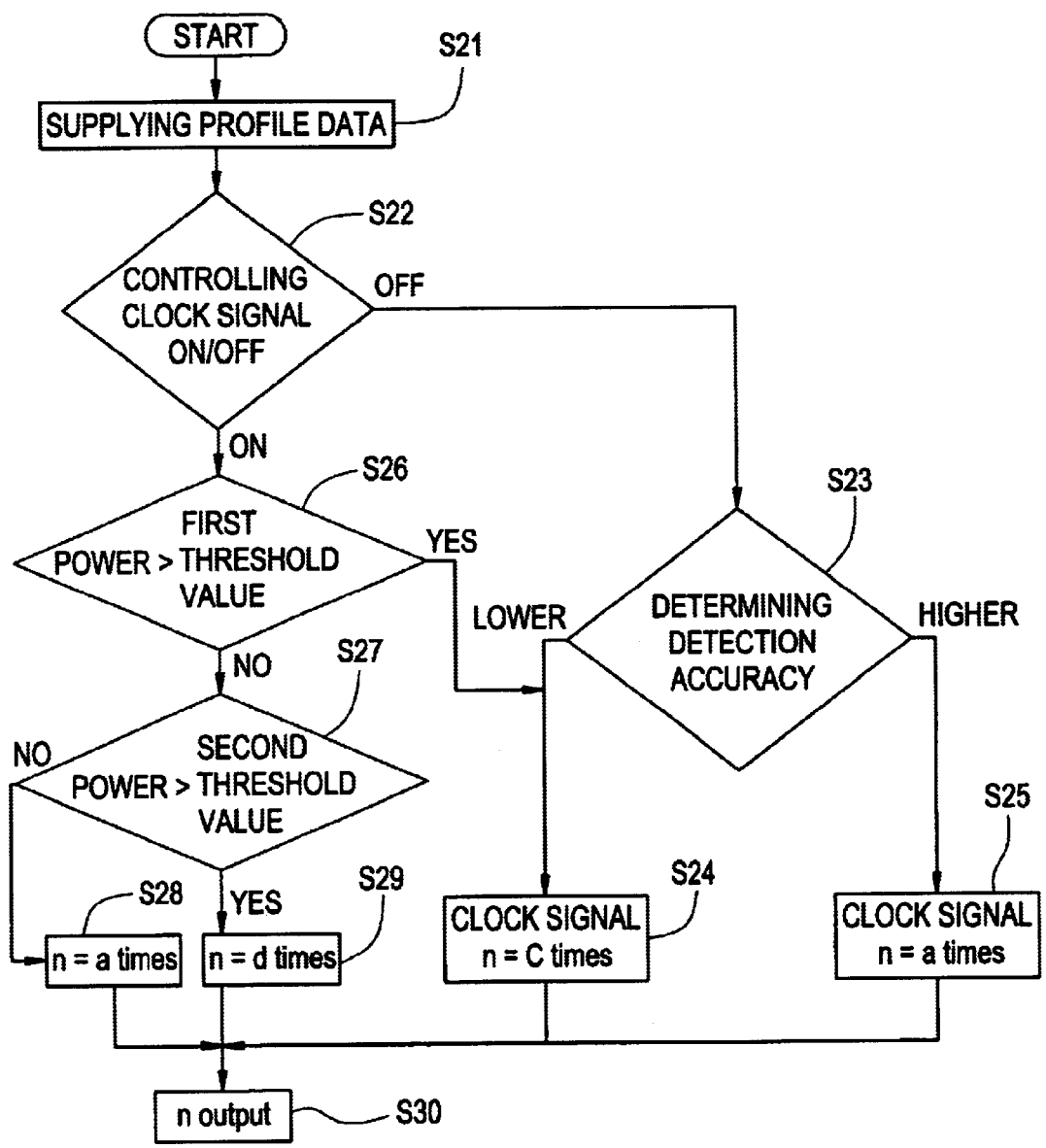
FIG. 9 is a flowchart of still another operation sequence of the level detector in the portable terminal shown in FIG. 1.

FIG. 9 shows still another operation sequence of level detector 40 in the portable terminal shown in FIG. 1.

As shown in FIG. 9, the profile data generated by profile generator 30 is supplied to level detector 40 in step S21. Then, Level detector 40 decides whether the sampling clock signal for determining a sampling rate in correlator 10 is to be automatically controlled or not in step S22.

If the sampling clock signal is not to be automatically controlled in step S22, then level detector 40 determines the accuracy with which to detect the received pilot signal in correlator 10 in step S23.

If the detection accuracy is determined to be lower in step S23, then the sampling clock signal to be supplied to correlator 10 is determined to be of a lower clock rate (C-times) in step S24. Level detector 40 outputs a control signal for generating the sampling clock signal to sampling clock generator 20 in step S30. Therefore, profile data is generated with a lower power.

If the detection accuracy is determined to be higher in step S13, then the sampling clock signal to be supplied to correlator 10 is determined to be of a higher clock rate (a times) in step S25. Level detector 40 outputs a control signal for generating the sampling clock signal to sampling clock generator 20 in step S30. Therefore, profile data is generated with a normal power.

If the sampling clock signal is to be automatically controlled in step S22, then level detector 40 compares the profile data generated by profile generator 30 with a predetermined first threshold value in step S26. If the profile data is equal to or greater than the first threshold value, then level detector 40 compares the profile data with a second threshold value greater than the first threshold value in step S27. If the profile data is greater than the second threshold value, then level detector 40 determines a sampling clock signal (n=d) for increasing the sampling rate, i.e., increasing the accuracy, in the correlating process in step S29. Thereafter, level detector 40 outputs a control signal for generating the sampling clock signal to sampling clock generator 20 in step S30. The number of correlating points is increased to generate profile data of higher accuracy.

If the profile data is equal to or smaller than the second threshold value in step S27, then the sampling clock signal to be supplied to correlator 10 is determined to be of a higher clock rate (a times) in step S28. Level detector 40 outputs a control signal for generating the sampling clock signal to sampling clock generator 20 in step S30.

If the profile data is less than the first threshold value, then the sampling clock signal to be supplied to correlator 10 is determined to be of a lower clock rate (C times) in step S24. Level detector 40 outputs a control signal for generating the sampling clock signal to sampling clock generator 20 in step S30. The sampling rates d, a, C are related by d>a>C.

The above operation sequence makes it possible to further increase the sampling rate for necessary points, allowing more detailed profile data to be acquired.

Three or more threshold values may be used to change sampling rates.

The level or threshold value for determining an oversampling rate may be changed each time profile data is to be determined, or an arrangement for changing sampling rates may be employed.

According to the present invention, as described above, the portable terminal has the level detector which compares profile data generated by the profile generator with a threshold value, and determines a sampling rate in order to increase the sampling rate at profile points in excess of the threshold value, of the profile data. Therefore, profile data is generated at a higher sampling clock rate at points which require a higher accuracy, and profile data is generated at a lower sampling clock rate at points which do not require such a higher accuracy, by reducing the number of sampling points. Accordingly, highly accurate profile data can be generated while at the same time the power consumption is reduced and the circuit scale of the portable terminal is reduced.

While preferred embodiments of the present invention have been described using specific terms, such description is for illustrative purposes only, and it is to be understood that changes and variations may be made without departing from the spirit or scope of the following claims.

What is claimed is:

1. A portable terminal comprising:

a correlator for performing a correlating process to calculate correlated values between a received pilot signal and internally generated patterns in timed relation to a supplied sampling clock signal, and output the calculated correlated values as correlated data;

a profile generator for generating profile data based on the correlated data outputted from said correlator;

a level detector for comparing the profile data generated by said profile generator with a predetermined threshold value, and determining a sampling rate for the correlating process performed by said correlator based on the result of the comparison; and a sampling clock generator for generating and changing a sampling clock signal to be supplied to said correlator based on the sampling rate determined by said level detector;

wherein said correlator performs said correlating process in timed relation to the sampling clock signal generated by said sampling clock generator.

2. A portable terminal according to claim 1, wherein said level detector comprises means for increasing the sampling rate at profile points in excess of said threshold value, of said profile data.

3. A portable terminal according to claim 2, wherein said sampling rate is variable based on the profile data supplied to said level detector.

4. A portable terminal according to claim 2, wherein said sampling clock generator comprises means for generating a sampling clock signal to lower said sampling rate independently of the sampling rate determined by said level detector.

5. A portable terminal according to claim 2, wherein said level detector has a plurality of threshold values, and means for determining a sampling rate based on said plurality of threshold values.

6. A portable terminal according to claim 2, wherein said threshold value is variable.

7. A portable terminal according to claim 1, wherein said sampling rate is variable based on the profile data supplied to said level detector.

8. A portable terminal according to claim 7, wherein said sampling clock generator comprises means for generating a sampling clock signal to lower said sampling rate independently of the sampling rate determined by said level detector.

9. A portable terminal according to claim 7, wherein said level detector has a plurality of threshold values, and means for determining a sampling rate based on said plurality of threshold values.

10. A portable terminal according to claim 7, wherein said threshold value is variable.

11. A portable terminal according to claim 1, wherein said sampling clock generator comprises means for generating a sampling clock signal to lower said sampling rate independently of the sampling rate determined by said level detector.

12. A portable terminal according to claim 11, wherein said level detector has a plurality of threshold values, and means for determining a sampling rate based on said plurality of threshold values.

13. A portable terminal according to claim 11, wherein said threshold value is variable.

14. A portable terminal according to claim 1, wherein said level detector has a plurality of threshold values, and means for determining a sampling rate based on said plurality of threshold values.

15. A portable terminal according to claim 14, wherein said threshold value or values are variable.

16. A portable terminal according to claim 1, wherein said threshold value is variable.

* * * * *